INVENTOR
VEIKKO LENNART VALO
ATTORNEY

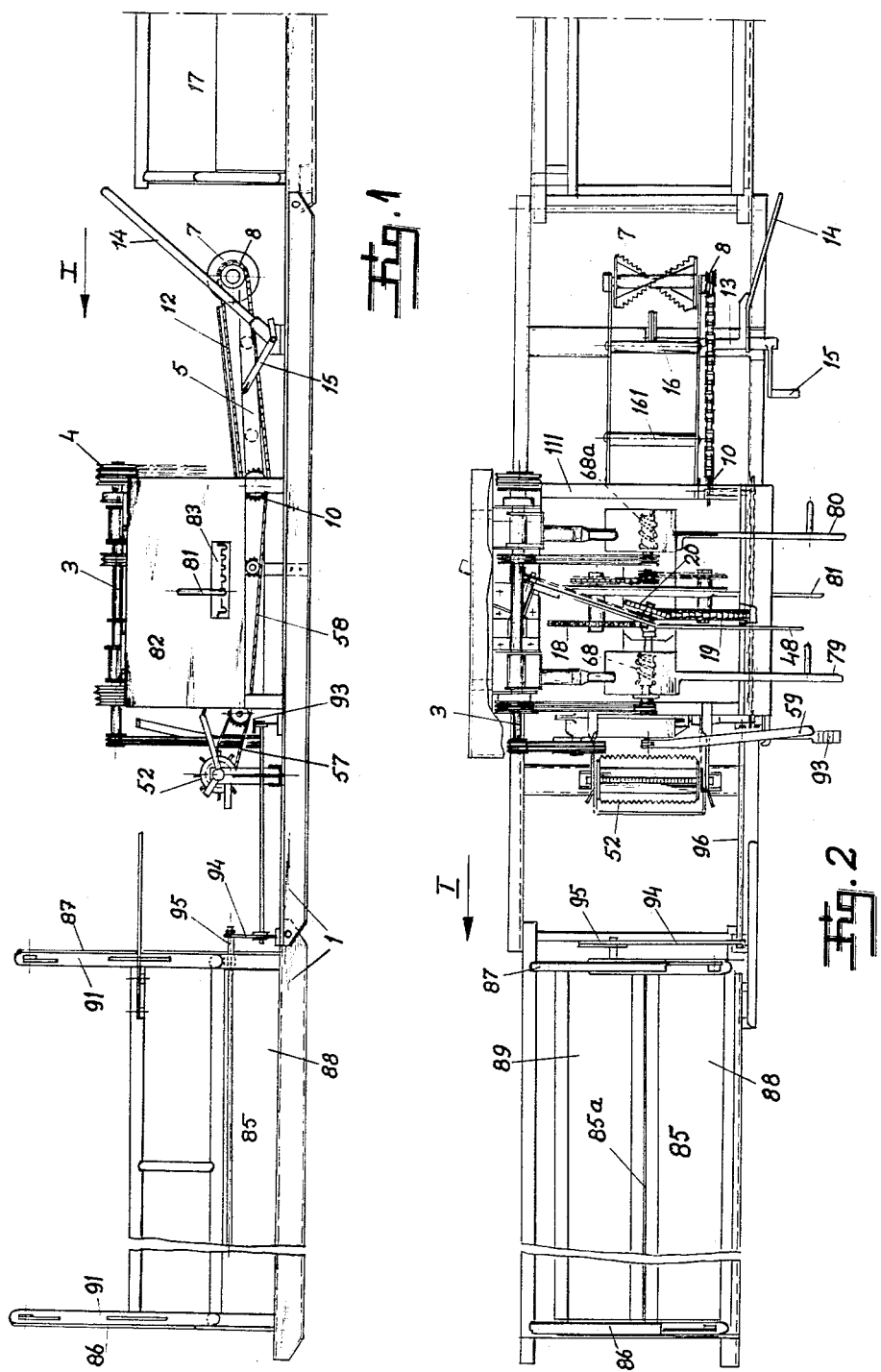

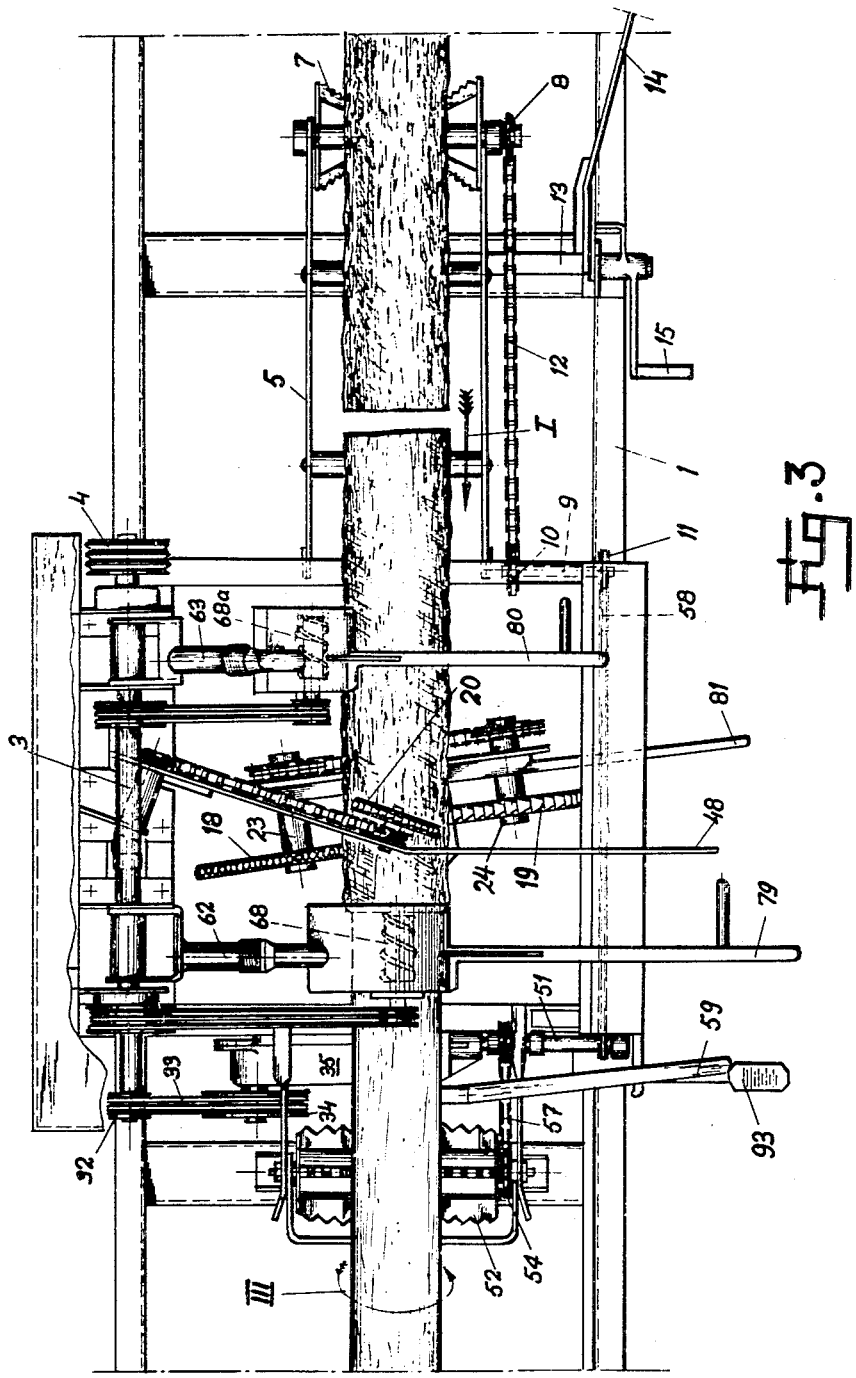

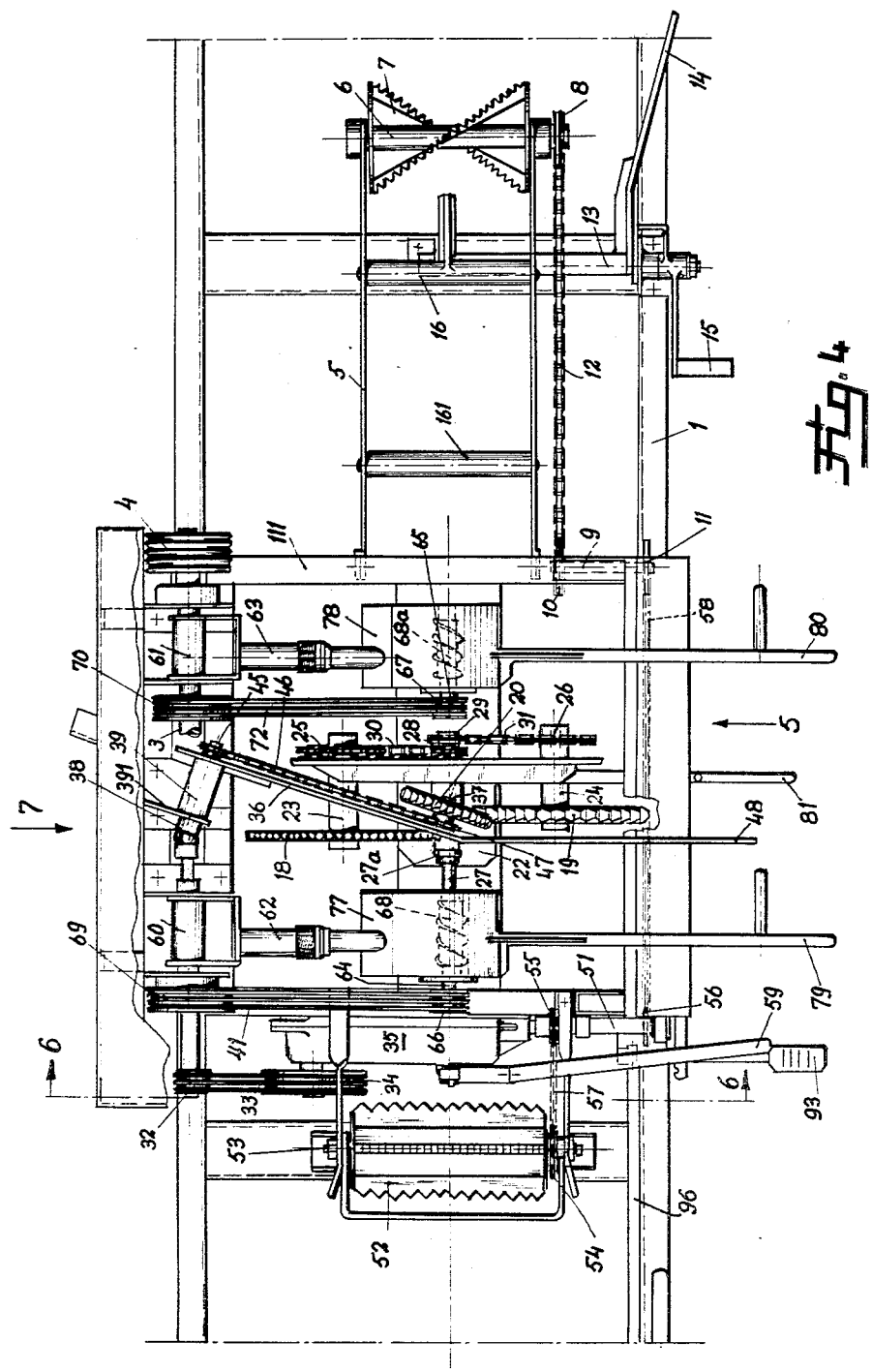

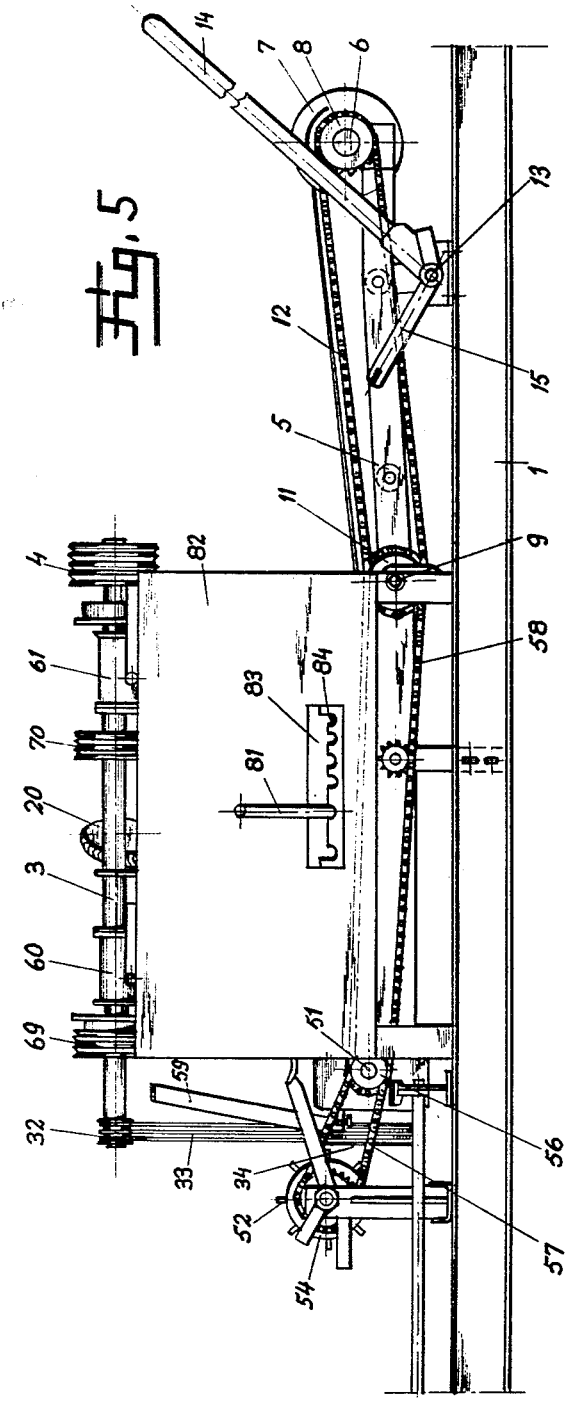

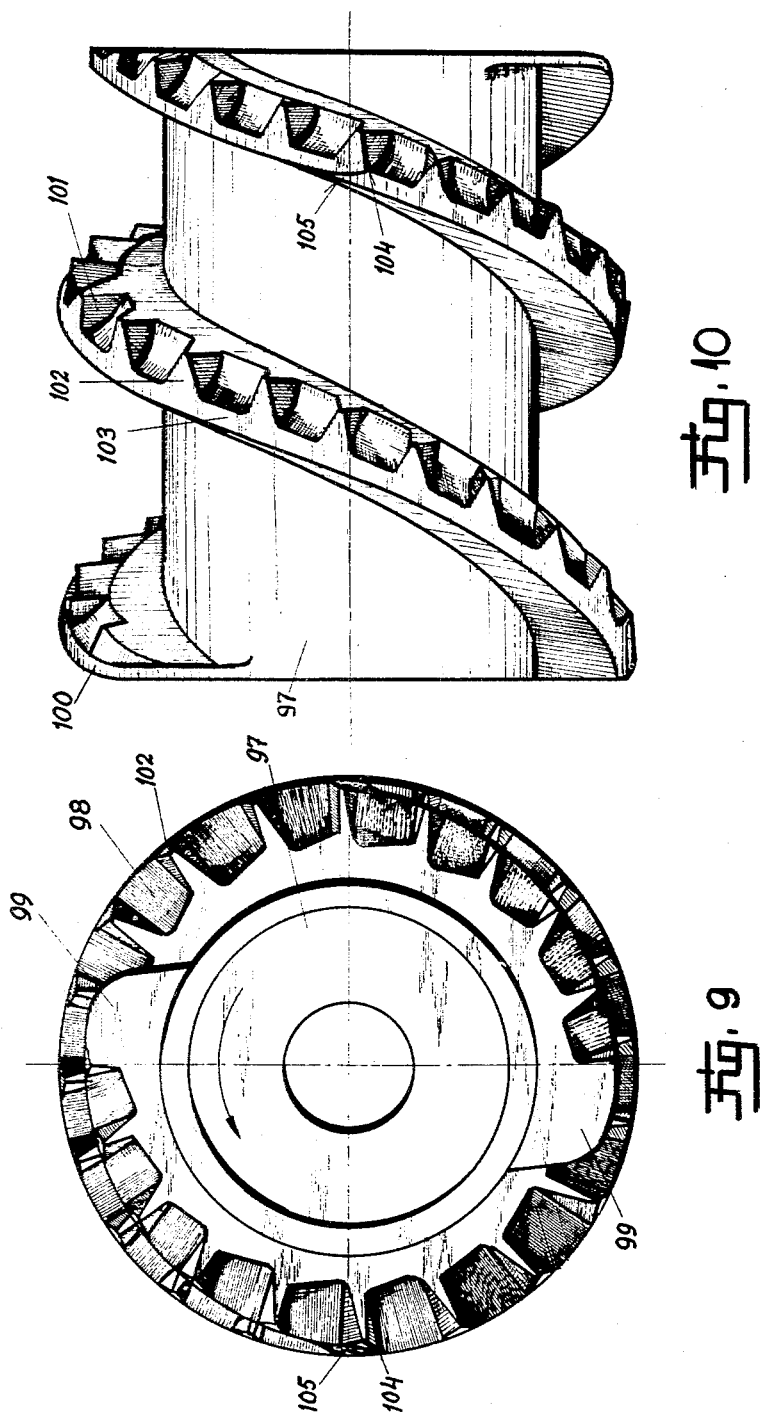

United States Patent Office 2,934,112
Patented Apr. 26, 1960

2,934,112

DEBARKING MACHINE HAVING LOG ROTATING AND ADVANCING WHEELS AND A SCREW-SHAPED CUTTER

Veikko Lennart Valo, Lohja, Finland

Application November 13, 1957, Serial No. 696,246

3 Claims. (Cl. 144—208)

This invention relates to a debarking machine for logs, pulpwood and the like.

The object of the invention is to provide a debarking machine by which logs and the like may be completely cleaned for instance for the preparation of the raw material for use in fine-paper manufacture. In the production of such completely debarked wood it is necessary to peel not only the bark but also a small layer of wood next to the bark and this removing of the wood layer has hitherto generally required hand work which was performed as an additional process after the machinery peeling was carried out by known devices. The machine according to the present invention eliminates all hand work.

Another object of the invention is to provide a debarking machine by which logs, always one at a time, are passed through and peeled in the machine. The logs are rotated around their longitudinal axes and peeled by rotating cutters engaging one side of the logs.

Still another object of the invention is an improved cutter adapted to be used in the debarking machine. Said cutter comprises in known manner a central shaft, arranged substantially parallel to the log to be peeled, said shaft having a cutting edge running as a screw winding around the tool axis and abutting the log surface, said screw winding comprising radially projecting cutting edges and a cam surface running along the outer ends of said cutting edges. The feature of the improved cutter is that said screw winding at its first part, for instance over ¼ of its length, is somewhat lower than at the other part, and has a clear step of about 3 mm. height between the two different levels of the winding.

The debarking machine itself according to the invention is mainly characterized by the fact that it comprises two feeding wheels arranged beside each other in the transverse direction of the machine and on two mutually parallel shafts, the wheels being adapted to carry the log between them, and a third wheel arranged over the afore-mentioned wheels on a pivoted rod, by which it can be pressed from above to abut the upper side of the log, the two first-mentioned wheels being carried by a bearing stand resting on a vertical axis as to be adjustable to different angles to the longitudinal direction of the machine, viz. the traveling direction of the log, said wheels being driven by a motor and having circumferential teeth so as to be able to engage, rotate and transport the log through the machine, whereby it passes two bark peeling cutters arranged at both sides of said wheel.

Another feature of the machine consists in two notched rollers, arranged on transverse shafts in the machine frame, one at the front part of the machine adapted to charge the unpeeled log into the machine and the one at the rear end of the machine adapted to remove the already peeled log from the machine, both rollers being driven by suitable transmission means by the machine motor.

With these and other objects in view, the invention consists in the features of construction hereinafter more fully described in detail with reference to the accompanying drawings which diagrammatically show a preferred embodiment of the arrangement.

In the drawing:

Fig. 1 is a side elevation of the whole machine.

Fig. 2 is a top elevation of the whole machine.

Fig. 3 is a top elevation of the main part of the machine on a larger scale than Figs. 1 and 2 and showing two logs passing the machine.

Fig. 4 is a top elevation of the same machine part as shown in Fig. 3 but without logs to be peeled.

Fig. 5 is a side elevation of the machine according to Figs. 3 and 4 as seen in the direction of the arrow 5 in Fig. 4.

Fig. 9 is an end elevation of the cutting tool and

Fig. 10 is a side elevation of the cutting tool.

Similar reference characters indicate corresponding parts throughout all figures in the drawings.

Figure 6:
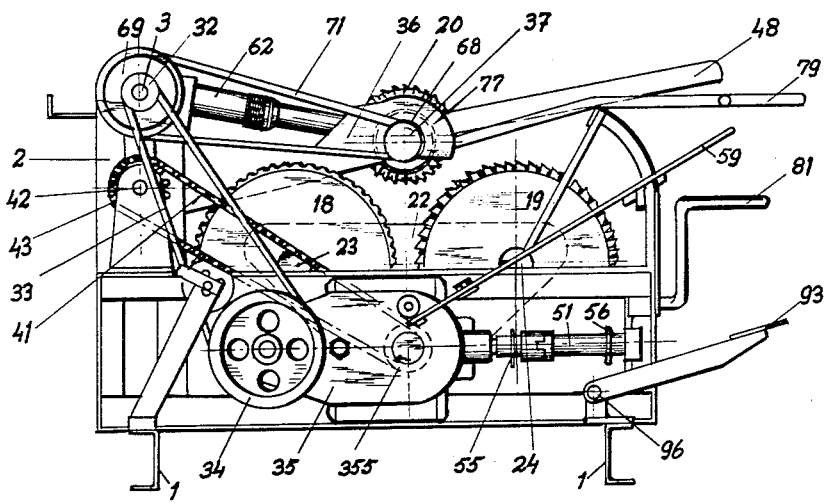
Fig. 6 is a transverse view of a part of the machine according to Figs. 3 to 5 seen according to a sectional line 6—6 in Fig. 4.

Referring to Figs. 1 and 2 the logs to be peeled are traveling in the direction from right to left as indicated by arrow I, said arrow being likewise shown in Fig. 3.

The machine rests on iron frames 1. At the front or entrance end of the machine is a stand 17 on which the log to be peeled is placed. The stand has the form of a channel. Therefrom the log is passed over to a roller 7, rotated by the machine motor (not shown) by the aid of the power-transmitting chain 12. The roller 7 charges the log into the main part, i.e. the actual peeling section of the machine, said section comprising two cutters 68 and 68a and between them, relative the traveling direction of the log, three maneuvering wheels 18, 19, 20. The wheels 18 and 19 are arranged to carry the log and the wheel 20 is arranged to rest upon the top side of the log. All wheels are rotated by the machine motor by the aid of driving belts running over a main power-transmission shaft 3. They have circumferential, radially projecting teeth adapted to engage the log surface and thereby rotate the log and pass it through the machine.

Behind the peeling device is another roller 52 arranged to move the peeled log from the peeling device into a discharging device 85 at the rear end of the machine. This device comprises a groove which may be opened at its bottom at 85a and removes the peeled log sidewards from the machine.

Figure 7:
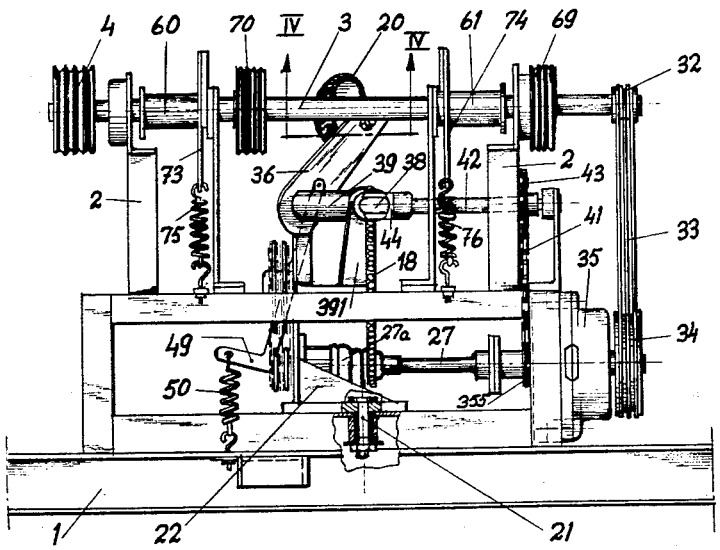
Fig. 7 shows the machine part of Figs. 3 to 5 seen in the direction of the arrow 7 in Fig. 4, some details being omitted in order to indicate other details more clearly.
Figure 8:
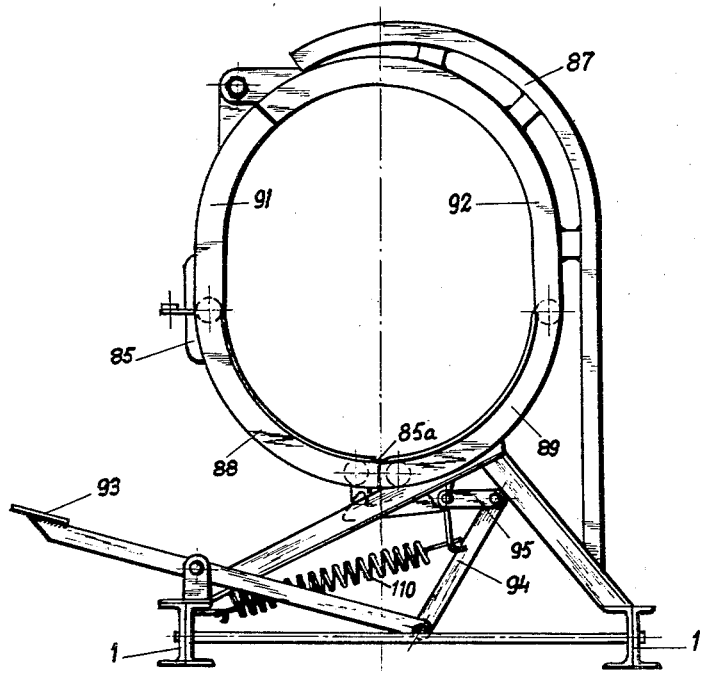
Fig. 8 shows a discharging device adapted to remove the already peeled log at the rear part of the machine.

Figs. 6 and 7 show two vertical pillars 2 carrying the main power-transmitting shaft 3 of the machine. This shaft is rotated by the aid of an electric motor and belts, not shown in the drawing, the latter running over the belt pulley 4 on the shaft 3. On the shaft 3 is a belt pulley 32 which by the belt 33 drives the belt pulley 34 and the power transmission 35 driving the shaft 27, transmitting power to the wheels 18 and 19 and 20. Further belt pulleys 69, 70 drive by belts 71, 72 respectively the cutters 68 and 68a, Fig. 4.

Figs. 3 to 5 indicate how the two transporting rollers are arranged at the front and rear end of the machine, the first one 7 being adapted to pass the log into the peeling section of the machine and the other one 52 to pass the already peeled log from the debarking section over and into the afore-mentioned discharging device 85 adapted to remove the logs sidewards from the debarking machine.

The device carrying the roller 7 adapted to charge the log to be peeled into the debarking section comprises a pivoted frame 5. The end of this frame carries the transverse shaft 6 of said roller 7. The roller 7 is rotated by the aid of a power-transmitting chain 12 running over a sprocket 8 on the end of the shaft 6. Between the iron frames 1 carrying the machine is a transverse beam 111 on which the frame 5 is hinged. This beam 111 carries further a short shaft 9 having two sprockets 10, 11. The afore-mentioned chain 12 runs over the sprockets 10 and 8. The shaft 9 is rotated by a chain 58, Figs. 4, 5, running over the sprocket 11 on the shaft 9 and another sprocket 56 on the shaft 51 connected to the gear transmission 35, Figs. 4, 6, 7. The frame 5 is adjustable in vertical direction by the pedal link 15 and the handle 14 arranged on the shaft 13, having an arm connected to the frame 5 and being adapted to depress or raise the same by the turning of the shaft 13, Figs. 4 and 5, bringing the roller 7 into contact with or removed from contact with the log to be peeled. When the handle bar 14 is lifted by hand, making a counter clockwise movement around its bearing point on the shaft 13, and the pedal bar 15, being in rigid connection with the bar 14 at the shaft 13, is simultaneously pressed down by foot, they will act upon the frame 5 by transmission elements (not shown in the drawing) and cause the frame 5 to be lifted. Thereupon, the roller 7 ascends and comes into contact with the logs passed to the machine. When the roller 7 is removed from contact with the logs, the handle 14 is pressed down clockwise around the shaft 13 whereby the roller 7 and the frame 5, due to their own weight, will again sink down. The frame 5 has two other transverse rollers 16 and 161 arranged as supplementary supports for the log.

When the log to be peeled is passed into the peeling machine it is engaged by the notched wheels 18, 19 and 20. The wheels 18 and 19 are supported by a stand 22 which is turnable around a vertical axis 21, Fig. 7. The shafts 23 and 24 of the feeding wheels 18 and 19 are carried by said stand 22, Fig. 6.

In Fig. 4 the part of the main shaft 3 indicated by the line IV—IV in Fig. 7 is omitted in order to more clearly show the details under said axis.

The shaft 23 of the wheel 18 is driven by aid of the sprocket 25, the chain 30 and the sprocket 28 on the shaft 27 which is rotated by the transmission 35. The wheel 19 being arranged on the shaft 24 is also driven by the shaft 27 over the sprocket 29, the chain 31 and the sprocket 26. The shaft 27 comprises two parts which by the aid of a coupling device 27a are connected to each other.

As appears from Fig. 6 the wheels 18 and 19 have the same diameter. By the aid of said teeth engaging the log they impart to the log a rotating movement around its own axis simultaneously as it is passed through the machine as is indicated by arrows III and I in Fig. 3. The speed of travel of the log depends upon the angle between the axis of the wheels 18, 19 and the longitudinal direction of the machine. The wheels 18 and 19 are arranged at the same level but somewhat spaced from each other in the longitudinal direction of the machine. The third notched wheel 20 arranged over the two earlier mentioned wheels 18 and 19 cooperated with them in transporting the log. It engages the log to be peeled from above whilst the two other wheels 18 and 19 are carrying the log from below. The wheels 18 and 19 rotate in the same direction, i.e. referring to Fig. 6 counterclockwise, whilst the smaller wheel 20 is rotating clockwise. The wheel 20 is carried by a shaft 37, Fig. 6, in one end of a rod 36, Figs. 6, 7, the other end of which is arranged pivotally on the shaft 38, Fig. 7, below the main shaft 3. The shaft 38 is fixed by the sleeve 39 to the machine stand 391. The wheel 20 secures its driving power from the shaft 42 driven by the transmission gear 35, the sprocket 355, the chain 41, and the second sprocket 43. The shaft 38 is connected to said shaft 42 by the aid of a coupling 44 and is arranged at an angle to said shaft 42. The free end of the shaft 38 carries a sprocket 45 which by the chain 46 transmits power to the sprocket 47 on the shaft 37 of the wheel 20. The rod 36 carrying the wheel 20 is connected to a handle 48 by the aid of which the feeding wheel 20 may be brought into contact with the log to be peeled or be removed therefrom. The rod 36 is connected to a bell crank 49, Fig. 7, which is loaded by a spring 50 connected to the frame 1 of the machine. The spring 50 is arranged so as to facilitate the lifting of the rod 49 and the feeding wheel 20 from engagement with the log to be peeled.

The transmitting gear 35 has a transverse shaft 51 which transmits power to the front roller 7 and the rear roller 52. The rear roller 52 is fixed on a transverse shaft 53 one end of which has a sprocket 54. The shaft 51 has two sprockets 55 and 56. The first one by means of the sprocket 54 and the chain 57 drives the roller 52. The second sprocket 56 drives the chain 58 and the sprocket 11 on the shaft 9 and further on the sprocket 10, the chain 12, the sprocket 8 and thereby the roller 7. The transmitting gear 35 is constructed to drive the shaft 51 and thereby the rollers 7 and 52 continually whilst the shaft 27 only effects the wheels 18, 19 when maneuvered by the clutch rod 59.

The cutters of the machine are arranged in the following way. The main shaft 3 of the machine carries two sleeves 60 and 61, the first mentioned being connected to a rod 62 and the latter to a rod 63 carrying horizontal shafts 64 and 65 respectively, on which the cutters 68 respectively 68a are arranged. The cutters receive their rotating movement from the main shaft 3 over the belt pulleys 69, 70, the belts 71, 72, and the pulleys 66, 67, respectively. The rods 73, 74 extending downwards from the sleeves 60 and 61 are connected to springs 75, 76, Fig. 7, the other ends of which are fixed to the frame of the machine and are adapted to maintain the rods 62 and 63 in such a position that the peeling tools 68, 68a respectively normally are not in contact with the log to be peeled, but may be regulated as to resiliently press the cutting tool against the logs when the cutting tools are adjusted into peeling position. The maneuvering of the cutters is effected by aid of handles 79, 80 which are connected to the covers 77, 78 of the cutters.

The machine works as follows: The log to be peeled is positioned in the groove of the stand 17 on the front side of the machine. By lifting the frame 5, Fig. 3, by the handle 14 the roller 7 is brought to engage the log and pass it into the machine in the direction of arrow I, Fig. 3. As soon as the front end of the log comes into contact with the feeding wheels 18, 19 the third feeding wheel 20 is depressed upon the upper surface of the log. The feeding wheels 18, 19 are brought to rotate by aid of the maneuvering 59 effectuating the coupling between the gear 35 and the shaft 27. The log is now rotated around its longitudinal axis by the wheels 18, 19, 20 as is shown by arrow III, Fig. 3. Then the stand 22 is turned in horizontal direction by the rod 81 into an inclined position as to the travelling direction of the log, whereby the wheels 18, 19 will force the log not only to rotate but also to move through the machine as is shown by arrow I, Fig. 3. The adjusting rod 81 projects through an aperture 83 in the plate 82. The under margin of the aperture 83 is notched at 84 in such a way that the rod can be locked in different positions. The more the rod 81 is moved to the right, Figs. 3 and 5, the faster will the wheels 18, 19 feed the log through the machine. If the rod 81 is brought to the left the wheels 18, 19 would feed the log in the opposite direction.

The arrangement of two different cutters, one at each side of the wheels 18, 19, and 20 is a special feature of the improved machine according to the invention.

When the log is moved into the machine, the right cutter 68a is lifted so that it does not affect the log. Having passed the wheels 18, 19, and 20 the cutter 68 will engage the log and peel it. The cutter 68a is only used for debarking the rear end of the log when this is approaching the wheels 18, 19. Only by providing two different cutters, one at either side of the transporting wheels 18, 19, is a complete debarking of both ends of the log obtainable.

The device 85 at the rear end of the machine comprises a channel like groove which is carried by frame irons 86, 87. It consists of two parts 88, 89, the transverse section of which has an annular form. The groove parts 88, 89 are carried by supporting beams 91, 92 which are bent against one another and connected mutually at the upper parts by a hinge in such a way that the groove parts 88, 89 may be moved away from one another leaving a space between them adapted to let the log escape and be removed. The groove is opened by the aid of a lever system 93, 94 and 95 and is kept in a closed position by the aid of spring 110. The discharge device 85 works in the following way. The peeled logs leaving the machine are passed by the roller 52 into the groove-like device 85. The logs are carried by the two lower parts 88 and 89 of the device. These parts consisting of two curved plates hinged at their ends pivotably in the beams 91, 92 are arranged to be moved away from each other when a peeled log is transported to lie within the device. When the parts 88, 89 supporting the log move away from each other the log will drop down through the opening slit 85a. The opening of the device is caused by pressing the treadle 93 down, whereby this treadle over the transmission system 94, 95 presses the parts 88, 89 apart. The spring 110 will draw the parts together and close the groove again when the treadle 93 is released.

The improved cutters used in the machine for the debarking work are indicated by reference characters 68, 68a, Figs. 9 and 10. Each cutter comprises a central shaft 97 arranged substantially parallel to the log to be peeled and has a cutting edge running as a screw winding 98 around the tool axis and is adapted to abut the log surface. Said screw winding 98 comprises in a known manner radially projecting cutting edges 101 and a cam surface 103 running along the outer ends 102 of said radial edges, the rear sharp-edged side 100 of said cam surface running along the outer ends of said radially projecting cutter, the latter being adapted to engage and remove the bark and a thin layer of wood. Now according to the present invention this cutting edge running as a screw around the central axis is improved by the arrangement that the screw winding at the front end 99 of the cutter, i.e. the end which at first comes in engagement with the log to be peeled is somewhat lower than the rear part of the screw cutting edge. The first part of the screw cutter is adapted mainly to remove the bark, and that part at the rear end to remove the wood layer just under the bark. The point where the front winding is getting its full height is designated 104 and forms a step 105. The difference of height between the front part of the screw winding and the rear part is about 1 to 3 mm. depending on the kind of log to be peeled.

The cutter as well as the log to be peeled are rotating in the same direction, shown in Fig. 3 by the arrow III. The diameter of the cutter is conveniently 4½" and length 4 to 5", the suitable speed rotation is about 3,000 r.p.m. The rotating speed of the log is suitably 60 r.p.m. By this speed the debarking machine will throw the removed bark away from the machine in such a way that it cannot harm the work. A short cutter as here described will further always be able to follow the surface of the log independently of smaller obstacles therein. A short tool can more easily follow the surface of the log than a long tool.

It is further suitable according to the invention to arrange a blower beneath the debarking machine, which removes the peeled bark and keeps the machine clean. Such a blower might throw the removed bark several meters from the machine.

A machine according to the present invention may be adapted for all kinds of woods and it always gives a completely cleaned product. It should of course be understood that the above exposition only describes a suitable embodiment of the machine which as to the details may be varied without departing from the scope of the invention.

What I claim is:

1. A debarking machine for logs comprising two cutting tools arranged one behind the other in the traveling direction of a log and three motor driven notched wheels on shafts extending generally in the traveling direction of a log, two of said wheels being arranged to support a log and a third wheel arranged to abut a log from above, paths of rotation of said wheels containing vertical planes extending between said cutter, and said wheels being adapted to rotate and axially feed a log past said cutters.

2. A debarking machine as described in claim 1, in which the shaft of the third notched wheel is mounted on a pivoted rod which is inclined to the traveling direction of a log in such a way that the wheel, when rotating, will help rotate and feed such a log toward the rear end of the machine.

3. A debarking machine as described in claim 1, in which at least one of said cutters is arranged to abut the side of the logs passing through the machine, the cutter having an axis parallel to the log's axis, a peeling edge running as a screw winding around said tool axis and cutting ribs on said screw winding disposed radially to said tool axis, the screw winding forming a cam surface along the outer edges of said ribs and being lower at the part arranged first to engage the log, for instance along ¼ of its total length, the lower and the higher part of the winding being separated by a step.

References Cited in the file of this patent

UNITED STATES PATENTS

| | | |
|---|---|---|
| 1,090,463 | Eidsaether | Mar. 17, 1914 |
| 1,921,904 | Bezner | Aug. 8, 1933 |
| 1,986,707 | Bezner | Jan. 1, 1935 |
| 2,027,173 | Jackson et al. | Jan. 7, 1936 |
| 2,230,336 | Taylor et al. | Feb. 4, 1941 |
| 2,305,281 | Taylor et al. | Dec. 15, 1942 |
| 2,652,867 | Boswell | Sept. 22, 1953 |
| 2,781,809 | Pence | Feb. 19, 1957 |
| 2,829,687 | Ramsdell et al. | Apr. 8, 1958 |

FOREIGN PATENTS

| | | |
|---|---|---|
| 145,978 | Sweden | June 29, 1954 |
| 154,716 | Sweden | June 5, 1956 |